United States Patent [19]
Nabell

[11] Patent Number: 6,031,706
[45] Date of Patent: Feb. 29, 2000

[54] PUNCH DOWN PROTECTION MODULE PROVIDING BOTH TRANSIENT PROTECTION AND LONGITUDINAL CURRENT PROTECTION

[75] Inventor: Robert E. Nabell, Ocala, Fla.

[73] Assignee: Emerson Electric Co., St. Louis, Mo.

[21] Appl. No.: 09/116,705

[22] Filed: Jul. 16, 1998

[51] Int. Cl.[7] ........................................... H02H 3/00
[52] U.S. Cl. .................... 361/111; 361/56; 361/58; 361/113; 361/118
[58] Field of Search .................. 361/56, 58, 111, 361/113, 93, 118, 119, 93.1

[56] References Cited

U.S. PATENT DOCUMENTS

| | | | |
|---|---|---|---|
| 4,703,983 | 11/1987 | Nabell et al. | 439/92 |
| 4,761,811 | 8/1988 | Zetena, Jr. | 379/397 |
| 5,647,767 | 7/1997 | Scheer et al. | 439/620 |

*Primary Examiner*—Stephen W. Jackson
*Attorney, Agent, or Firm*—Arnold White & Durkee

[57] ABSTRACT

A single circuit protection module for protecting a first T/R pair that is electrically coupled to a punch down connection block from undesirable transients and longitudinal currents that appear on a second T/R pair that is electrically coupled to the punch down block and to the first T/R pair through the punch down block.

20 Claims, 5 Drawing Sheets

PUNCH DOWN PROTECTION MODULE PROVIDING BOTH TRANSIENT PROTECTION AND LONGITUDINAL CURRENT PROTECTION

FIELD OF THE INVENTION

This invention relates generally to circuit and line protection devices and, in particular, to telecommunications circuit and line protection devices of the type that may be readily coupled to standard punch down connection blocks.

BACKGROUND OF THE INVENTION

In typical telecommunication systems, a site location (e.g., a large building) is electrically connected to a telephone service provider through one or more telephone lines. Typically, each telephone line is made up of a pair of wires or conductors where one of the conductors is known as the tip (T) and the other is known as the ring (R). As such, each telephone line is commonly referred to as a "T/R pair."

For most site locations, the incoming T/R pairs for the site are all routed to a central location, often referred to as a telephone room. T/R pairs corresponding to communications equipment located within the site (e.g., telephones, modems, etc.) are also routed to the telephone room, such that the communication connections between the incoming T/R pairs and the corresponding internal T/R pairs are made through the customer premise equipment ("CPE"). Often the incoming T/R pairs are connected to the internal T/R pairs through the use of standard punch down connection blocks, or "punch down blocks." Thus the telephone room is one location where connections are made between T/R pairs using a punch down block.

Additionally, within site locations connections are made between T/R pairs using punch down blocks. Such T/R pair connections are used to provide extension lines for communications equipment and are also used, for various purposes, in PBX and key systems. Thus, in typical communication systems, there are a number of T/R pair connections that are made through the use of punch down blocks.

An example of a punch down block may be found in U.S. Pat. No. 3,234,498, issued to A. Logan. The punch down block of the referenced patent consists of a plurality of split blade-like metallic terminals arranged side-by-side in rows forming a rectangular array of terminals mounted in an electrical insulating block. The terminals are of the insulation-penetrating clip type which penetrates the insulation of a T or R conductor and tightly clamps and makes electrical contact with the conductor. The terminals are blade-like and are arranged side-by-side in rows so that faces of the terminals lie in a horizontal plane. Punch down blocks of the type referred to are common in the telecommunications industry and take various forms, including the form commonly referred to as a standard M1-50 or 66M1-50 or 66 punch down block.

To protect the communications equipment located within the site, circuit protection devices are often coupled to the input and internal T/R pairs at the telephone room or to the T/R pairs associated with another T/R pair connection, such as a connection associated with an extension line. Such protection devices may take the form of transient surge suppression devices. In many instances the circuit protection devices are adapted to receive the blades of a standard punch down block, such that the circuit protection devices may be coupled to the appropriate T/R pairs via the punch down block. Such circuit protection devices, capable of receiving the blades of a standard punch down block, are referred to herein as "punch down protection modules."

While many punch down protection modules provide acceptable transient over-current or transient over-voltage protection for short-term "lightning-like" transients, they often do not provide protection against various longer-duration electrical phenomena—sometimes referred to as longitudinal over-currents and/or ground equalization currents—that may appear on one of the T/R pairs as a result of a fault current or a ground equalization problem. As a result, such longitudinal over-currents, or other similar electrical phenomena, may pass from one of the T/R pairs to the corresponding T/R pair, thus, damaging the site equipment to which the corresponding T/R pair is attached.

One solution that has been proposed to address this problem is to couple an external choke coil in series with either the input or internal T/R pair. Such external choke coils often result in space-taking and "clumsy" arrangements, in that, the external choke coils require a significant amount of space and separate wiring. This problem can be particularly acute when multiple input and internal T/R lines and thus multiple external choke coils are used. Additionally, the use of external choke coils requires additional installation time and expense.

It is an object of the present invention to overcome the described and other limitations of the prior art and to provide a single, unitary punch down protection module that requires minimal space and provides both transient circuit protection and protection against longitudinal over-currents, ground equalization currents, or other similar electrical phenomena.

SUMMARY OF THE INVENTION

In accordance with one embodiment of the present invention, a punch down protection module providing both transient protection and longitudinal current protection is provided. The novel punch down protection module may include transient over-voltage and/or over-current protection devices, as well as a longitudinal choke coil of significant inductance to minimize the passing of longitudinal over-currents to protected communications equipment.

DETAILED DESCRIPTION OF THE INVENTION

Figure 1A:
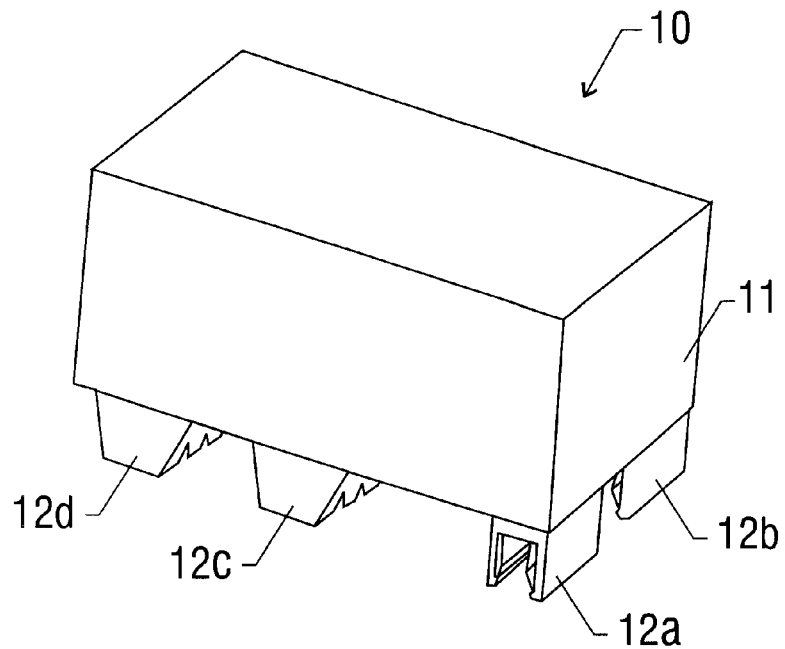
FIGS. 1A and 1B illustrate an exemplary punch down connection module constructed according to certain teachings of the present invention.

Turning to the drawings and, in particular to FIG. 1A, a punch down protection module 10 providing transient protection and longitudinal current protection is illustrated. As illustrated, the module 10 comprises a substantially rectangular outer housing 11 that may be formed of plastic or another suitable material. In the illustrated embodiment, the outer housing 11 defines a plurality of projecting members 12a, 12b, 12c and 12d that are designed to encase a number of electrically conductive connectors that are discussed in more detail below. Those of ordinary skill in the art having the benefit of this disclosure will appreciate that the illustrated construction of the outer housing 11 is exemplary only, and that housings of other sizes and shapes may be utilized without departing from the teachings of the present invention.

Figure 1B:
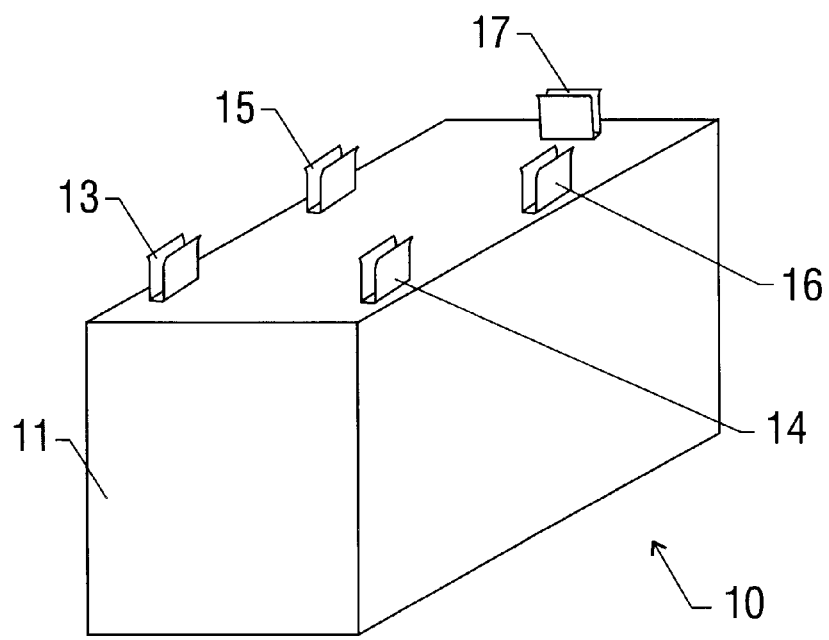

FIG. 1B provides an alternate view of the module 10 of FIG. 1A. For purposes of illustration, the projecting members 12a–12d are not shown in FIG. 1B. As shown in FIG. 1B, the module 10 includes five electrically conductive connectors. In the illustrated embodiment, the electrically conductive connectors comprise conductive clips 13, 14, 15, 16 and 17. Clips 13, 14, 15 and 16 are adapted to receive and engage the terminals of a standard punch down block (e.g., a M1-50 or 66 block) and thus provide an electrical connection between the appropriate clip and the corresponding terminal of the punch down block. As discussed in more detail blow, clip 17 is adapted to be coupled to a ground rail element to provide a ground connection to the module 10.

In the embodiment of FIG. 1B, each of the clips 13–17 is constructed to include a two-pronged clasp that is designed to engage and "sandwich" either the terminal of a standard punch down block (for clips 13–16) or a ground rail element (clip 17). Alternate embodiments are envisioned in which other forms of clips, or other conductive connector devices, are used to mechanically and electrically couple the appropriate terminals of module 10 to the terminals of a standard punch down block and ground rail.

Figure 2:
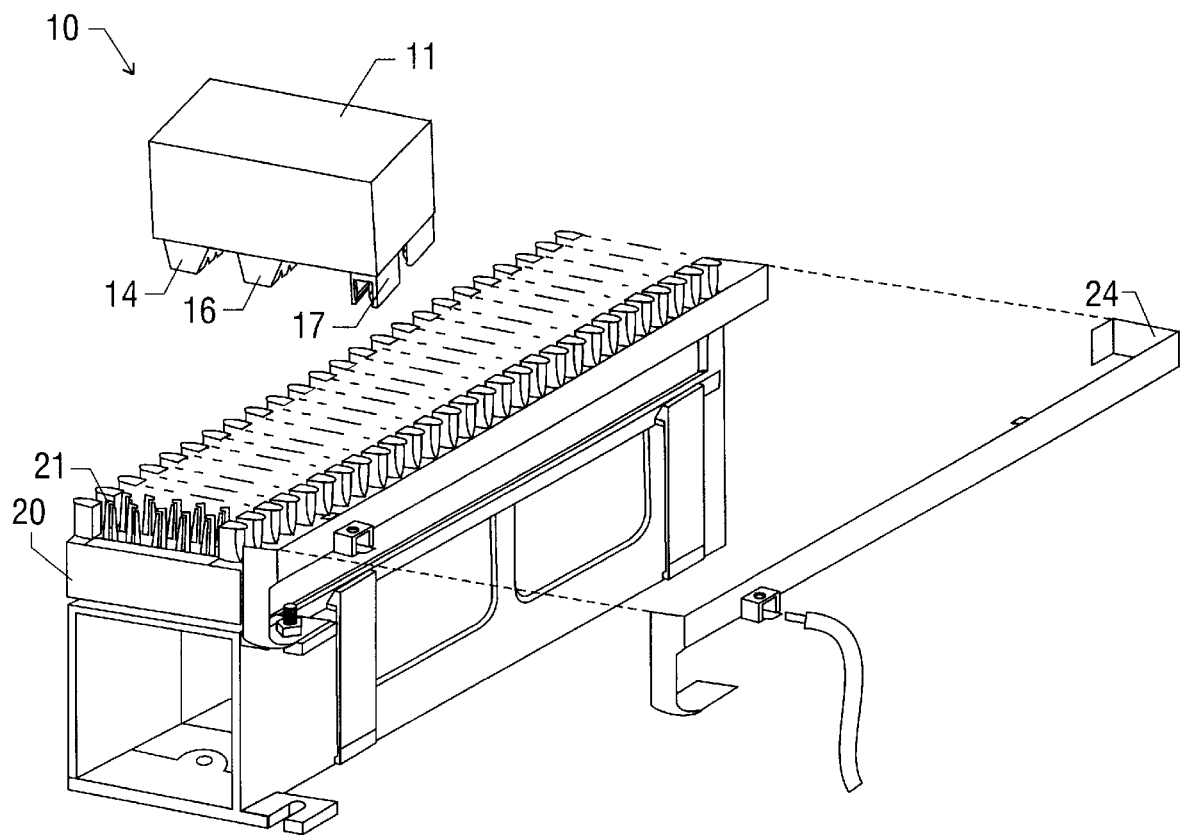
FIG. 2 illustrates the manner in which the punch down module of FIGS. 1A and 1B may be coupled to the terminals of a standard punch down connection block.

FIG. 2 illustrates the manner in which the module 10 may be coupled to the terminals 21 of a standard punch down block 20. FIG. 2 also illustrates the manner in which the clip 17 of module 10 may be coupled to a grounding rail 24 which, in the illustrated embodiment, is mechanically coupled to the punch down block 20. The use of ground rails, like ground rail 24, with punch down protection modules is discussed in detail in U.S. Pat. No. 4,703,983, the entirety of which is hereby incorporated by reference.

Although not illustrated in FIG. 2, the module 10 is constructed such that, in operation, when the module 10 is properly positioned on the punch down block 20, and when input and internal T/R pairs are coupled to the block, clip 15 will be coupled to the input T line, clip 16 will be coupled to the input R line, clip 13 will be coupled to the internal T line, and clip 14 will be coupled to the internal R line. Those of ordinary skill in the art will appreciate that the specific line-clip arrangement discussed herein is exemplary only and that other line-clip arrangements may be used without departing form the present invention. Although much of the discussion herein is in the context of input and internal T/R pairs of the type that may be found in a telephone room, it will be understood that the present invention is applicable to all T/R pair connections, including connections that occur with extension lines.

Figure 3:
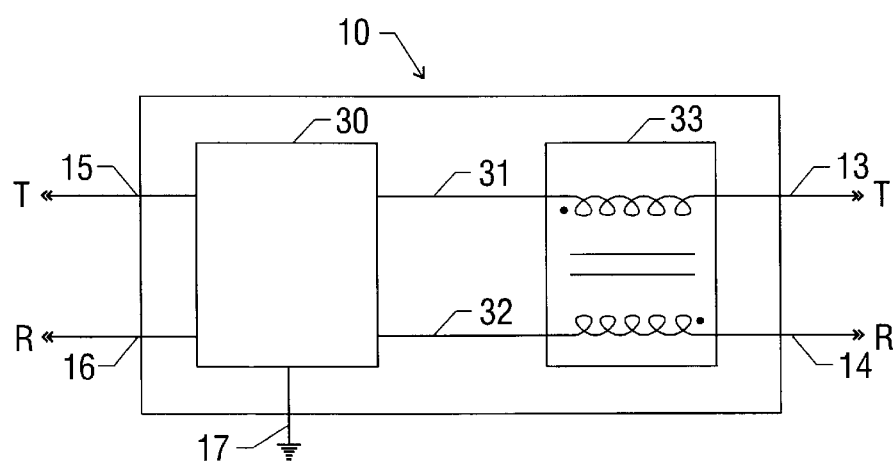
FIG. 3 provides a schematic representation of an exemplary electrical protection circuit that may be positioned within the module of FIGS. 1A and 1B.

Although not illustrated in FIGS. 1A or 1B, module 10 includes an electrical protection circuit that is positioned within the housing 11 and that is electrically coupled to the clips 13–17. FIG. 3 provides a schematic representation of that circuit.

Turning to FIG. 3, the electric circuit of module 10 includes a transient protection circuit 30 that is coupled to receive at its inputs the input T and R lines coupled, respectively, to clips 15 and 16. Transient protection circuit 30 is also coupled to ground via clip 17. In general, the transient protection circuit 30 defines two conductive members, an upper member corresponding to the T line and a lower member corresponding to the R line.

Transient protection circuit 30 may be any circuit element or combination of elements that provides transient protection (e.g., transient over-voltage and/or over-current protection). For example, the transient protection circuit 30 may be constructed using solid state silicon avalanche foldback technology and either standard fuses or polyswitch resettable fuses ("PTCs").

In general, for over-voltage protection, transient protection circuit 30 should be constructed to switch from a normal high ground impedance state—in which signals pass from the input T/R lines 15, 16 through circuit 30 to the internal T/R lines 13, 14—to a low ground impudence state upon the detection of an over-voltage. While the circuit 30 is in the low ground impedance state, the signal from the input T/R pair is diverted to ground, thus, protecting the internal T/R pair from the over-voltage. For over-current protection, transient protection circuit 30 should be constructed to switch from a low-impedance state—in which signals readily pass from the input T/R lines 15, 16 through circuit 30 to the internal T/R lines 13, 14—to a high impedance state in which all or most of the signals on the input T/R pair is prevented from passing through to the internal T/R pair.

Transient protection circuit 30 may be constructed using components currently used on various transient protection modules including the TSP, COHP, OPX and ESP modules currently available from EDCO Inc. of Florida. Those of ordinary skill in the art will appreciate that other forms of transient protection circuits, for example, those using MOVs, silicon breakdown devices, and/or gas tube devices, may be used without departing from the scope and spirit of the present invention.

Referring back to FIG. 3, the outputs 31 and 32 from the transient protection circuit 30 are coupled to the inputs of a longitudinal current protection circuit. In the illustrated embodiment, the longitudinal current protection circuit comprises a high-inductance longitudinal choke member 33 that defines two conductive members, a first conductive member corresponding to the T line and a second corresponding to the R line. In the illustrated embodiment, the longitudinal choke member 33 comprises a wound inductive member having a bi-filar conductor wound about a central paramagnetic core. The bi-filar conductor may be formed of any suitable conductive material, such as solid 22 gauge connection wire. In the illustrated example, the longitudinal choke member 33 was formed with approximately 1000 turns and has a minimum inductance of no less than approximately 1.3 Henries. In one preferred embodiment, the windings of the longitudinal choke member 33 are balanced within 1% to minimize signal distortion and the device is constructed to have a 2500 VAC Hipot, winding to winding, and a 2500 VAC Hipot, winding to core.

Those of ordinary skill in the art will appreciate that the specific turn information, construction information and inductance information provided for longitudinal choke member 33 are exemplary only. In general, all that is required is that the inductance of the longitudinal choke 33 be high with respect to the inductance of the input T/R pair.

In the embodiment of FIG. 3, the longitudinal choke member 33 is coupled to the output of the transient protection circuit 33. Alternate embodiments are envisioned wherein the longitudinal choke member 33 is coupled to the input of the transient protection circuit. There are advantages that may be obtained by coupling the longitudinal choke member 33 to the output of transient protection circuit 30, however. Coupling the longitudinal choke member 33 to the output of the transient protection circuit 30 ensures that the longitudinal choke member 33 will not be subjected to extremely high voltages and, thus, reduces the change that undesired arcing will occur between the conductors that comprise the longitudinal choke member.

The longitudinal choke member 33 is designed and constructed to mitigate and minimize ground equalization current disturbances. The general operation of the longitudinal choke member 33 is reflected in FIGS. 4A and 4B.

Figure 4A:
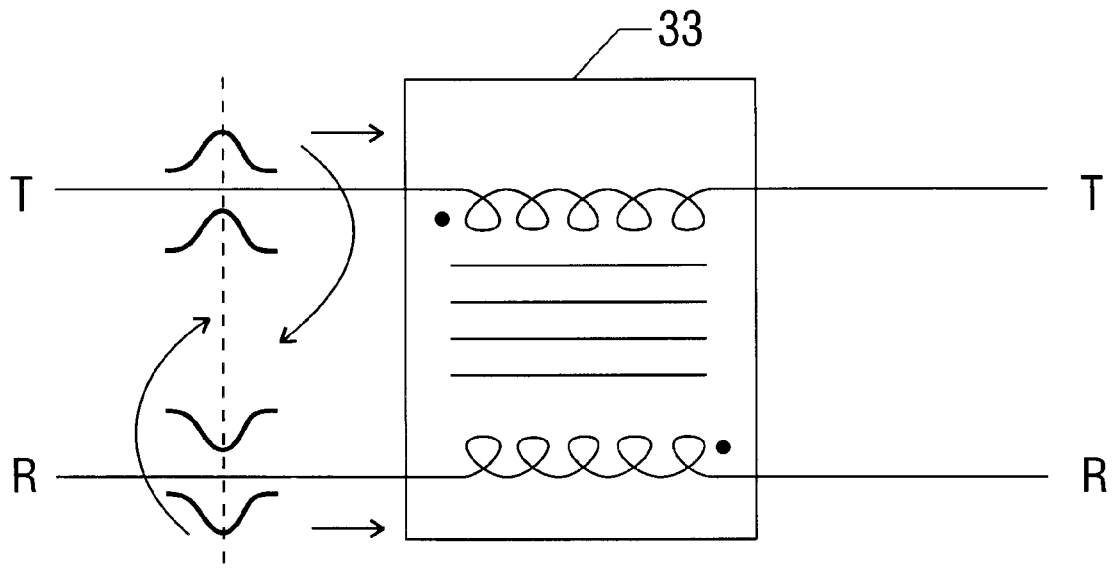
FIGS. 4A and 4B illustrate the operation of a longitudinal choke member that may form part of the electrical protection circuit of FIG. 3.

FIG. 4A illustrates the operation of the longitudinal choke member 33 during normal operation conditioned when a ground equalization current is not present. In such normal operation, useful signals (e.g., signals corresponding to communications data and/or voice information) are received by one of the T/R pairs. In the example of FIG. 4A, the useful signals are received at the signals are received at the input T/R pair, although member 33 will be the same when the useful signals are received at the internal T/R pair. The useful signals received by T/R pairs in communication circuits are sometimes referred to as "metallic mode waveforms."

A characteristic of metallic mode waveforms that represent useful information is that the metallic mode waveform applied to the T line of a given T/R pair will be 180 degrees out of phase of the corresponding R line for the given T/R pair with respect to ground. Because of the inductive nature of the longitudinal choke member 33, the presence of a signal on the T input will generate a flux in the core of member 33 that will tend to produce a mirror image waveform (i.e., a waveform that is 180 degrees out of phase from the waveform at the T input) at the portion of the member 33 corresponding to the R line. Because of the nature of the useful metallic mode waveforms, the induced waveform will be in phase and thus will strengthen the signal that is provided to the R line portion of the longitudinal choke member 33. In a similar manner, useful signals applied to the R line of member 33 will induce waveforms that are in phase with and will strengthen useful signals applied to the T input of member 33.

As set forth above, in the metallic mode, during normal operation, useful signals applied to the input T/R pair of longitudinal choke member 33 are passed without negative distortion through to the internal T/R pair. Similarly, during normal operation, useful signals applied to the internal T/R pair are passed through longitudinal choke member 33 to the input T/R pair without negative distortion.

Figure 4B:
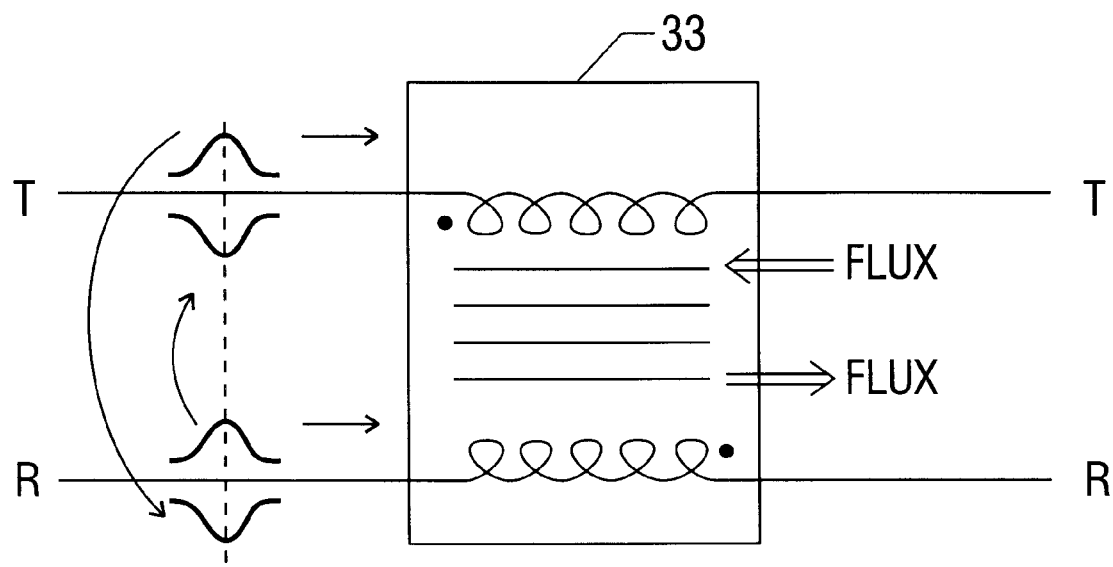

FIG. 4B illustrates the operation of longitudinal choke member 33 when an undesirable signal, such as a ground equalization current signal, is applied to the input T/R pair. Unlike desirable signals, a characteristic of undesirable signals is that the signal applied to the T line is in phase with the signal applied to the R line with respect to ground. Thus, the signal on the T line will induce, through the inductive nature of member 33, a waveform on the R line of member 33 a waveform that is 180 degrees out of phase with the undesirable waveform applied to the T line. In a similar manner, the undesirable signal applied to the R line will induce a waveform on the T line that is 180 degrees out of phase from the undesirable waveform applied to the R line. These out of phase signals applied to and induced on the T and R lines of member 33 will tend to cancel each other out, thus, preventing the transmission of the undesirable signal applied to the input T/R pair to the internal T/R pair or significantly reducing the transmission of the undesirable signal to the internal T/R pair.

Figure 5:
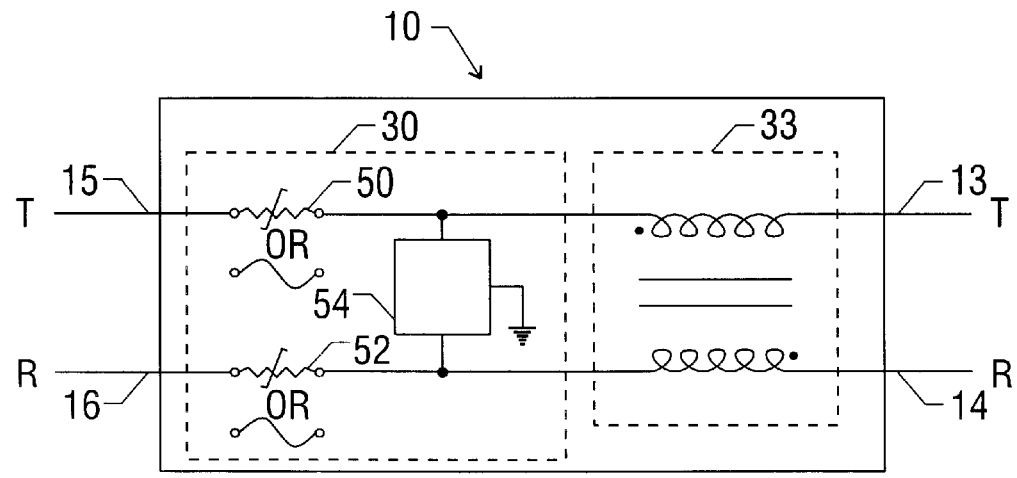
FIG. 5 provides a detailed schematic for one exemplary embodiment of the electrical protection circuit of FIG. 3.

FIG. 5 provides a detailed illustration of a specific embodiment of module 10. In the illustrated embodiment, the longitudinal choke member 33 is constructed as described with respect to FIG. 3. The transient protection circuit is formed from two fuse elements 50 and 52 each of which is coupled in series with one of the input lined from the input T/R pair. The fuse elements 50 and 52 may be common wire fuses or PTC devices. In general, the fuse elements will temporarily or, alternately, permanently, open when an over-current is applied to either input line, thus preventing the over-current from passing from the input T/R pair to the internal T/R pair.

The transient protection circuit 30 also includes a over-voltage clamping device 54 that is coupled across the lines of the input T/R pair and to ground. The over-voltage clamping device may be a MOV, a silicon breakover device, a gas tube device or a silicon avalanche diode. In general, whenever the voltage applied to either input T or R line exceeds a certain value, the over-voltage clamping device 54 will divert the over-voltage to ground, thus protecting the internal T/R lines.

Figure 6A:
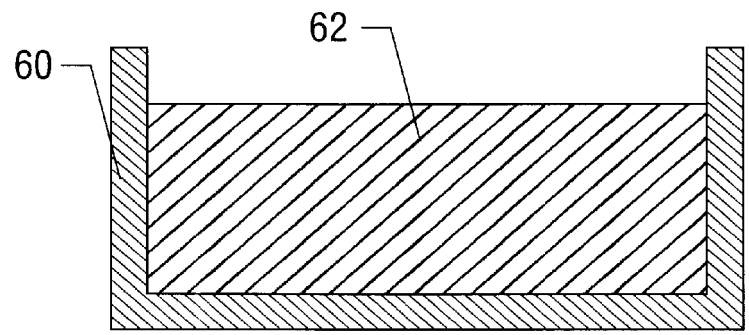
FIGS. 6A and 6B illustrate one method by which the module of FIGS. 1A and 1B may be constructed.
Figure 6B:
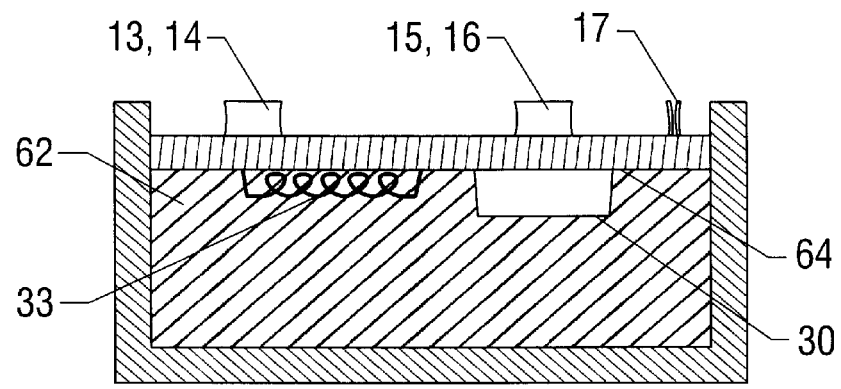

FIGS. 6A and 6B generally illustrate one method by which the punch down protection module 10 may be constructed. Referring to FIG. 6A, a substantially rectangular hollow housing member 60 may be provided. The housing 60 may then be substantially filled with a liquid epoxy solution 62. In a further manufacturing step, illustrated in FIG. 6B, a printed circuit board 64 may be placed within the rectangular housing member 60 such that it extends into the epoxy solution. On one side of the printed circuit board, the clasp portions of clips 13–17 extend. On the other side of printed circuit board 64, the components comprising the transient protection circuit 30 and the longitudinal choke member 33 are attached through conventional methods (e.g., soldering). When the epoxy hardens, the printed circuit board 64 and the associated components will be held in place, thus forming module 10.

Those of ordinary skill in the art will appreciate that alternate construction methods may be used without departing from the scope and spirit of the present invention. For example, the plastic housing 10 can simply be snapped onto the printed circuit board 64.

The above description of several exemplary embodiments is made by way of example and not for purposes of limitation. Many variations may be made to the embodiments and methods disclosed herein without departing from the scope and spirit of the present invention. For example, in the illustrated embodiments, the transient protection circuit 30 of the module 10 is coupled to ground via a clip 17 and a ground rail 24. This particular method of grounding the transient protection circuit 30 is not critical to all aspects of the present invention. Alternate embodiments are envisioned where the transient protection circuit is coupled to the ground via a screw-on ground rails arrangement, a "pig tail" type connection where the circuit 30 is coupled to the ground via a wire attached to module 10, or through other suitable grounding structures and methods.

Figure 7:
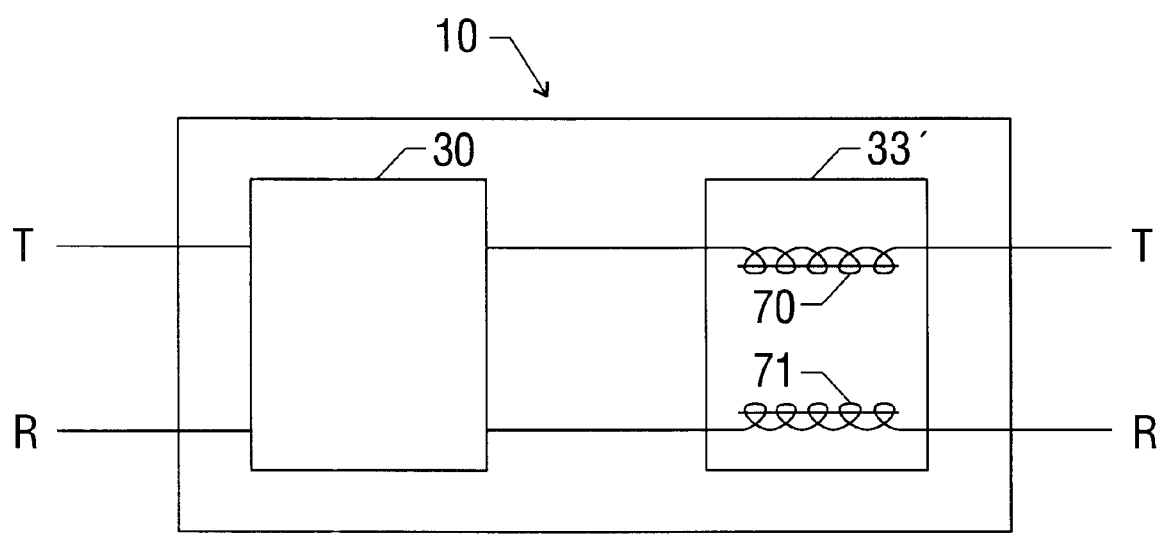
FIG. 7 illustrates an alternate construction of the electrical protection circuit of FIG. 3 in which the longitudinal choke member is formed from two inductive members with uncoupled cores.

Still further alternate embodiments are envisioned concerning the construction of the longitudinal choke member. In the previously-described embodiments, the longitudinal choke member was illustrated and described as including a common core coupling the T line to the line. Alternate embodiments are envisioned in which the longitudinal choke member is formed from two separate inductive members and where each of the T and R lines is wound about a separate core. A schematic representation of such an embodiment is provided in FIG. 7 where a longitudinal choke member 33 is illustrated as comprising separate T and R inductive members 70 and 71 that are not coupled through a common core. While the use of separate core longitudinal choke members will not have the out of phase canceling effect described above with respect to the coupled core embodiment, the separate core embodiment will nonetheless provide a higher degree of longitudinal current protection than is available in current protection modules.

The present invention is intended to be limited only by the scope and spirit of the following claims.

I claim as my invention:

1. A punch down protection module providing both transient protection and longitudinal current protection comprising:
   a housing;
   an electrical protection circuit positioned within the housing, the electrical protection circuit including: (i) a first set of electrically conductive connectors, wherein each connector is adapted to engage a terminal of a punch down connection block; (ii) a transient protection circuit defining two conductive members, each of the conductive members of the transient protection circuit being electrically coupled to one connector in the first set of electrically conductive connectors; (iii) a longitudinal choke member defining two conductive members, each of the conductive members of the longitudinal choke circuit being electrically coupled to one of the conductive members defined by the transient protection circuit; and (iv) a second set of electrically conductive connectors, where each connector in the second set is adapted to engage a terminal of a punch down connection block.

2. The punch down protection module of claim 1 wherein first set of electrically conductive connectors comprise conductive clips adapted to receive and engage electrical terminals.

3. The punch down protection module of claim 1 wherein said first set of electrically conductive connectors comprise five electrically conductive connectors.

4. The punch down protection module of claim 1 wherein said transient protection circuit is constructed from solid state silicon avalanche feedback technology.

5. The punch down protection module of claim 1 wherein said transient protection circuit is comprised of a plurality of resettable fuses.

6. The punch down protection module of claim 1 wherein said transient protection circuit is operable to switch from a high ground impedance state to a low ground impedance state.

7. The punch down protection module of claim 1 wherein said longitudinal choke member comprises a wound inductive member having a bi-filar conductor wound about a central paramagnetic core.

8. The punch down protection module of claim 7 wherein the windings of said longitudinal choke member are balanced within 1%.

9. The punch down protection module of claim 1 wherein said longitudinal choke member is electrically coupled to the outgoing conductive members of said transient protection circuit.

10. The punch down protection module of claim 1 wherein said longitudinal choke member is coupled to the input conductive members of said transient protection circuit.

11. The punch down protection module of claim 1 wherein said longitudinal choke member comprises two separate inductive members wherein each said conductive member is wound about a separate core.

12. A circuit protection module for protecting a first T/R pair that is electrically coupled to a punch down connection block from undesirable transients and longitudinal currents that appear on a second T/R pair that is electrically coupled to the punch down block and to the first T/R pair through the punch down block, the circuit protection module comprising:
   a first group of electrical connectors adapted to engage the punch down block at the location where the second T/R pair is coupled to the punch down block;
   a transient protection circuit electrically coupled to the first group of electrical connectors, the transient protection circuit operating to reduce the transmission of undesirable transients through the transient protection circuit;
   a longitudinal current protection circuit electrically coupled to the transient protection circuit, the longitudinal current protection circuit operating to reduce the transmission of undesirable longitudinal transients through the longitudinal protection circuit; and
   a second group of electrical connectors electrically coupled to the longitudinal protection circuit, the second group of electrical connectors being adapted to engage the punch down block at the location where the first T/R pair is coupled to the punch down block.

13. The circuit protection module of claim 12 wherein said transient protection circuit is constructed from solid state silicon avalanche feedback technology.

14. The circuit protection module of claim 12 wherein said transient protection circuit is comprised of a plurality of resettable fuses.

15. The circuit protection module of claim 12 wherein said longitudinal current protection circuit comprises a wound inductive member having a bi-filar conductor wound about a central paramagnetic core.

16. The circuit protection module of claim 15 wherein the windings of said longitudinal current protection circuit are balanced within 1%.

17. The circuit protection module of claim 12 wherein said longitudinal current protection circuit is electrically coupled to the outgoing conductive members of said transient protection circuit.

18. The circuit protection module of claim 12 wherein said longitudinal current protection circuit is coupled to the input conductive members of said transient protection circuit.

19. The circuit protection module of claim 12 wherein said longitudinal current protection circuit comprises two separate inductive members wherein each said conductive member is wound about a separate core.

20. A single module apparatus for protecting a first pair of communication lines from undesirable electrical phenomena that appears on a second pair of communication lines electrically coupled to the first pair of communication lines through a punch down block, the single module apparatus comprising:
   a housing;
   protection means for receiving at an input a pair of conductors electrically coupled to the second pair of communication lines and providing at an output a pair of conductors electrically coupled to the first pair of communication lines, the protection means reducing the transmission of both undesirable transients and undesirable longitudinal currents from its input to its output, the protection means being positioned within the housing;

means electrically connected to the input of the protection means for coupling the input of the protection means to the portion of the punch down block to which the second pair of communications lines is coupled; and means electrically connected to the output of the protection means for coupling the output of the protection means to the portion of the punch down block to which the first set of communication lines is coupled.

* * * * *